C. BOWEN.
BUMPER FOR AUTOMOBILES.
APPLICATION FILED FEB. 7, 1920.

1,363,201.

Patented Dec. 21, 1920.

Charles Bowen Inventor

By A. G. Burns Attorney

UNITED STATES PATENT OFFICE.

CHARLES BOWEN, OF FORT WAYNE, INDIANA, ASSIGNOR OF ONE-FIFTH TO FRED GASKINS, ONE-FIFTH TO ARTHUR G. NIEBERGALL, ONE-FIFTH TO JOHN E. O'CONNOR, AND ONE-FIFTH TO CHARLES A. SPANLEY, ALL OF FORT WAYNE, INDIANA.

BUMPER FOR AUTOMOBILES.

1,363,201.  Specification of Letters Patent.  Patented Dec. 21, 1920.

Application filed February 7, 1920. Serial No. 356,968.

*To all whom it may concern:*

Be it known that I, CHARLES BOWEN, a citizen of the United States of America, and resident of Fort Wayne, in the county of Allen and State of Indiana, have invented certain new and useful Improvements in Bumpers for Automobiles, of which the following is a specification.

This invention relates to improvements in bumpers for automobiles and the object thereof is to provide a bumper proper having yielding tendencies and rigid supporting means in connection with the frame of an automobile, and to so construct the supporting means that the bumper proper attached thereto will be held from vibrating vertically or shifting laterally.

Figure 1:
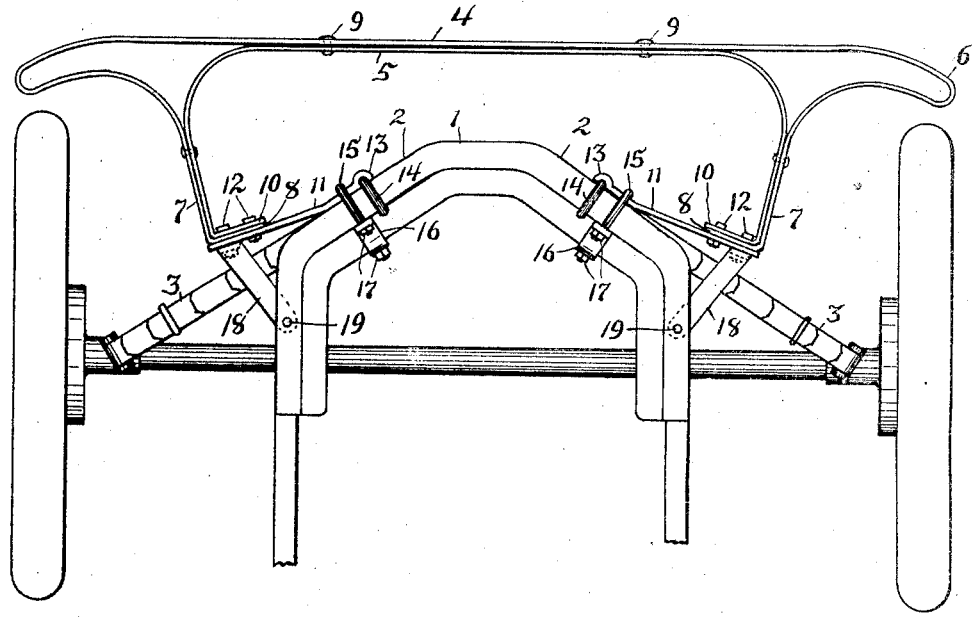
Figure 2:
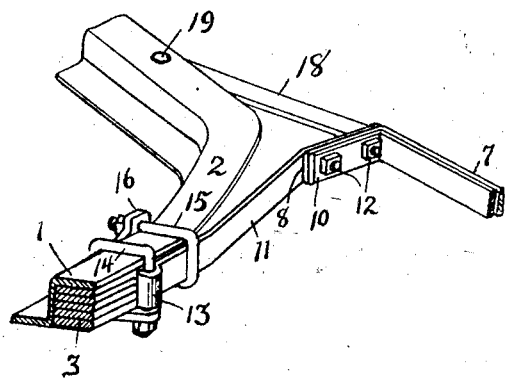

The object of the improvement is accomplished by the construction illustrated in the accompanying drawings in which:

Figure 1 is a plan view of the bumper and its supporting means in connection with the frame of an automobile; and Fig. 2 is a detail view in perspective showing one of the supporting brackets and its connection with the frame of an automobile.

Similar characters of reference indicate corresponding parts in both views and having reference now to the same:

1 is a protruding end of an automobile frame of well known construction having convergent portions 2 to which are secured the supporting springs 3.

The bumper proper is comprised of an outer member 4 and an inner member 5, the outer member being formed with a curved hook 6 at each end thereof and with a corresponding slanting arm 7 with a bent extremity 8. The inner member lies in the same horizontal plane as the outer member with its middle portion permanently secured to the corresponding portion of the outer member by means of rivets 9, and each end portion of the member fits against the corresponding arm 7 of the outer member with a bent extremity 10 fitting against the corresponding extremity 8 thereof.

A supporting bracket 11 is provided for each of the ends of the bumper proper, the extremities thereof being both secured to the outer ends of the corresponding brackets by means of bolts 12. The opposite end of the bracket has formed therein a hook 13 adapted to fit over the clip 14 that secures the spring 3 to the side 2 of the frame 1, and is rigidly secured against the adjacent face of the spring and to the frame by means of a clip 15. A shackle 16 is provided for each of the clips 15 and is shaped to fit against the inner side of the frame, the clip being secured by nuts 17.

Each of the brackets 11 has secured thereto at its outer end a brace 18 by means of one of the bolts 12, and the opposite end of the brace is secured to the frame 1 by a bolt 19, the brace being positioned so as to prevent endwise movement of the corresponding arm 7 of the outer member and adjacent portion of the inner member.

In forming the bumper proper the outer member is shaped so that its lateral hook portions extend beyond the lateral portions of the inner member, and the extending hook portions have yielding tendency, while the middle portion of the inner member and the extremities thereof are rigidly connected with the corresponding parts of the outer member so as to reinforce at such places the bumper proper. The device thus constructed and secured is held rigidly in its proper position relative to the frame so as to yieldingly resist impacts that may be imposed upon it.

What I claim is:

1. In a device of the class described, a bumper proper comprised of an outer and inner member, the former having a hook formed in each of its lateral portions that extends beyond the corresponding portion of the inner member, the middle portion of the inner member and the extremities thereof being rigidly connected to the corresponding parts of the outer member; a pair of brackets having connection at their outer ends respectively with the corresponding extremities of said members and being adapted to be secured at their opposite ends to the frame of the automobile; and a brace in connection with each bracket at the outer end thereof and being connected at its opposite end with the frame.

2. In a device of the class described, a bumper proper having oppositely extending lateral hooks and inwardly extending extremities; a supporting means including a pair of brackets secured at their respective inner ends to the frame of the automobile and at their outer ends to the corresponding extremities of the bumper proper; and a brace having connection with the outer end of each bracket and the corresponding extremities of the bumper proper and being connected at its opposite end with the frame.

3. In a bumper for automobiles having a protruding frame with divergent sides, a bumper proper comprised of inner and outer members, the middle portion of the former and the extremities thereof being rigidly secured to the corresponding portions of the latter member, there being laterally extending hooks formed in the latter member; and a supporting means in rigid connection with the extremities of the members secured to the respective divergent sides of the frame including a brace in connection with the frame for the support of the corresponding extremities.

In testimony whereof I affix my signature, in presence of two witnesses.

CHARLES BOWEN.

Witnesses:
 MATILDA METTLER,
 WALTER G. BURNS.